(12) United States Patent
Sugeno et al.

(10) Patent No.: US 6,260,055 B1
(45) Date of Patent: Jul. 10, 2001

(54) DATA SPLIT PARALLEL SHIFTER AND PARALLEL ADDER/SUBTRACTOR

(75) Inventors: Yukio Sugeno; Takeshi Yoshida, both of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/172,772

(22) Filed: Oct. 15, 1998

(30) Foreign Application Priority Data

Oct. 15, 1997 (JP) .................................................. 9-282214
Oct. 16, 1997 (JP) .................................................. 9-283969

(51) Int. Cl.[7] ..................................................... G06F 7/50
(52) U.S. Cl. ........................................... 708/518; 708/706
(58) Field of Search ................................... 708/518, 670, 708/706, 714

(56) References Cited

U.S. PATENT DOCUMENTS

| | | | |
|---|---|---|---|
| 5,327,369 | * 7/1994 | Ashkenazi | ............................. 708/518 |
| 5,615,140 | * 3/1997 | Ishikawa | ................................ 708/518 |
| 5,719,802 | * 2/1998 | Purcell et al. | ........................ 708/518 |
| 5,943,251 | * 8/1999 | Jiang et al. | ............................ 708/706 |
| 6,003,125 | * 12/1999 | Shippy | .................................. 708/518 |

\* cited by examiner

*Primary Examiner*—David H. Malzahn
(74) *Attorney, Agent, or Firm*—Foley & Lardner

(57) ABSTRACT

Shift of input data without split by a shifter, generation of code extension data by a code extension data generator, and generation of a mask signal by a mask signal generator are carried out in parallel. The mask signal generator generates the mask signal based on an amount of shift and split mode information. An output selector replaces data shifted by the shifter with code extension data bit by bit based on the mask signal, and outputs data which are shifted and code-extended according to the split mode information and arithmetic/logical shift information. In a carry-select type adder/subtractor as another embodiment, if split parallel process is to be executed, both a pair of unit adders/subtractors execute an arithmetic operation to be carried out for the case where no carry is supplied from lower digits, and then a selector selects an arithmetic result, which is obtained when no carry is supplied from lower digits, regardless of the carry from the lower digits.

9 Claims, 13 Drawing Sheets

DATA SPLIT PARALLEL SHIFTER AND PARALLEL ADDER/SUBTRACTOR

BACKGROUND OF THE INVENTION

1. Field of the Invention

The present invention relates to a data split parallel shifter for splitting data in connection with a processing of a microprocessor and then executing a shifting operation. Further, the present invention relates to an adder/subtractor and, more particularly, an adder/subtractor employed in a processor for supporting mainly multimedia functions, etc.

2. Description of the Prior Art

In a processor module of a processor for executing data processing, as an approach for improving a data processing efficiency, there is a processing system in which data are split into a plurality of fields and then data in respective fields are processed in bulk. For example, 64-bit data is split into four 16-bit data and then four adding operations are executed at the same time according to an add command.

| A[63:48] | A[47:32] | A[31:16] | A[15:0] |
|----------|----------|----------|---------|
| + | + | + | + |
| B[63:48] | B[47:32] | B[31:16] | B[15:0] |
| = | = | = | = |
| C[63:48] | C[47:32] | C[31:16] | C[15:0] |

This processing system can show its performance in the fields such as image processing, speech processing, etc. rather than existing scientific and technical computation, business processing computation, etc. These processings need a shifting process in addition to the arithmetic operations and the logical operation. Normally, as the shifting process, there are the logical shift in which 0 is filled in vacant locations caused by shift, and the arithmetic shift which executes the code extension. In order to enable the shifting process after the data is split into a plurality of fields, a switching process indicating which portion of the fields should be code-extended in conformity with split mode is requested. For example, the results derived when a 3-bit rightward arithmetic shift is applied to 32-Bit data in a 32 bit mode, a 16 bit×2 mode, and an 8 bit×4 mode respectively are given in the following.

|                 | bit 31 |       |       | bit 0 |
|-----------------|--------|-------|-------|-------|
| Original data   | 110 11011 | 001 10101 | 001 00100 | 100 10100 |
| 32 bit mode     | <u>111</u> 11011 | 011 00110 | 101 00100 | 100 10010 |
| 16 bit × 2 mode | <u>111</u> 11011 | 011 00110 | <u>000</u> 00100 | 100 10010 |
| 8 bit × 4 mode  | <u>111</u> 11011 | <u>000</u> 00110 | <u>000</u> 00100 | <u>111</u> 10010 |

Out of the above data, underlined portions are code extension portions. That is, the code extension is applied to the bit 31 in the 32-bit shift mode. In the 16 bit×2 mode, the code extension is applied to the bit 31 in upper 16 bits, while the code extension is applied to the bit 15 in lower 16 bits. In the 8 bit×4 mode, the bit 31 is extended in the bit range from the bit 31 to the bit 24, the bit 23 is extended in the bit range from the bit 23 to the bit 16, the bit 15 is extended in the bit range from the bit 15 to the bit 8, and the bit 7 is extended in the bit range from the bit 7 to the bit 0. In the logical shift, the above underlined portions are extended into 0.

Next, a configuration of the shifter will be explained hereunder. For clarification of explanation, the rightward shifting process will be explained.

To begin with, the normal shifter without a split function will be explained. A normal 32-bit rightward shifter is shown in FIG. 1. In FIG. 1, in the 32-bit shifter, bit shifters 101 to 105 for shifting the data by 1 bit, 2 bit, 4 bit, 8 bit, and 16 bit respectively are connected in a multistage fashion. Such bit shifters are constructed by a simple selector respectively. The 32-bit shifter is constructed by stacking these selectors in a multistage fashion. The 1-bit shifter 101 outputs data, which is located at the bit adjacent to the corresponding bit on the left side by one bit, out of the data supplied from the 2-bit shifter 102 when the shifting is executed, while the 1-bit shifter 101 outputs data located at the corresponding bit as it is when the shifting is not executed. A select signal indicating whether adjacent data should be output or the data should be output as it is can be generated based on the least significant bit of the signal indicating an amount of shift and the signal indicating the leftward/rightward shifting direction. More particularly, the 1-bit shifting is executed if 1 is set at the least significant bit, while the 1-bit shifting is not needed if 0 is set at the least significant bit and thus the data is output downward as it is. In the 2-bit shifter 102, either the data located on the left side by two bits in relation to the corresponding bit should be output or the data located at the corresponding bit should be output as it is can be selected. The select signal for the 2-bit shifter 102 is a value on the second least significant bit in the signal indicating the amount of shift. Depending upon that which shifters are to be operated in compliance with the amount-of-shift signal respectively, the shifting operation to achieve any amount of shift ranging from the 0 bit to 31 bit can be carried out. For instance, in the case of the 3-bit shifting, shift of the data is effected by the 1-bit shifter 101 and 2-bit shifter 102, nevertheless no shift of the data is effected by other shifters 103, 104, 105.

Unless the data is split into the fields, the code extension process can be implemented by extending either the leftmost value of the original data, if the arithmetic shift is applied, or b 0, if the logical shift is applied, by the bit number equal to the amount of shift from the most significant bit in respective shifters.

The data used in code extension consists of a control signal indicating which one of the arithmetic shift and the logical shift should be executed and actual code extension data, and such data can be generated previously in a code extension data generator. For example, there is no left-hand data to be fetched for the leftmost selector in the 1-bit shifter 101. However, if the code extension data supplied from the code extension data generator is inserted into the port, such leftmost selector can output the code extension data when one-bit shift is generated.

As shown in FIG. 2, the code extension data generator is constructed to comprise multiplexers 106 to 108 and logic gates 109 to 112, for example. In the arithmetic shift in which an arithmetic shift signal is at a high level, according to such configuration, the bit 31 of the original data is output as the code extension data for all 32 bits in the 32-bit shift mode. Then, in the 16 bit×2 mode, the bit 31 of the original data is output in the bit range of the upper bits 31 to 16 while the bit 15 of the original data is output in the bit range of the lower bits 15 to 0. Then, in the 8 bit×4 mode, the bit 31 of the original data is output in the bit range of the bits 31 to 24, the bit 23 of the original data is output in the bit range of the bits 23 to 16, the bit 15 of the original data is output in the bit range of the bits 15 to 8, and the bit 7 of the original data is output in the bit range of the bits 7 to 0. On the contrary, in the logical shift in which the arithmetic shift signal is at a low level, 0 is output to all bits as the code extension data.

In the event that the 16 bit×2 mode and the 8 bit×4 mode, described above, are added to the shifter shown in FIG. 1, it becomes an issue how the above code extension process should be carried out. As shown in FIG. 3, in order to add the code extension function, code extension selectors 113 for selecting either the code extension or the normal shift can be inserted between respective stages of the shifters 101 to 105 respectively.

In the 16bit×2 mode, the 16-bit shifter 105 controls all code extension selectors 113 to select the code extension. In the 8-bit shifter 104, the code extension selector 113 controls to select the code extension for the bits 15 to 8. Similarly, the 4-bit shifter 103 controls to select the code extension for the bits 15 to 12, the 2-bit shifter 102 controls to select the code extension for the bits 15 to 14, and the 1-bit shifter 101 controls to select the code extension for the bit 15.

In the 8 bit×4 mode, the 16-bit shifter 105 and the 8-bit shifter 104 controls all code extension selectors 113 to select the code extension. The 4-bit shifter 103 controls the code extension selectors 113 to select the code extension data for the bits 23 to 20, the bits 15 to 12, the bits 7 to 4. The 2-bit shifter 102 controls the code extension selectors 113 to select the code extension data for the bits 23 to 22, the bits 15 to 14, the bits 7 to 6. The 1-bit shifter 101 controls the code extension selectors 113 to select the code extension data for the bit 23, the bit 15, the bit 7.

In this way, if the code extension selectors 113 are inserted between the bit shifters respectively, the data can be split into a plurality of fields to achieve parallel shift. However, since such code extension selectors 113 are implemented by the selector which is the same in structure as the shifter, the circuit has twice the stage number of the normal shifter and thus a processing speed becomes very slow. In addition, the case where the code extension data generators are provided has been explained, but a delay time caused to generate the code extension data by the circuit is added to an entire delay time as it is in this case. As a method wherein the code extension data generator is not employed, the selector for selecting which data should be employed as the code extension data according to respective modes may be added to respective code extension selectors 113. In this case, increases in the delay of speed and the circuit scale are caused beyond the case where the code extension data generators are employed.

In the normal shifter, the data must be passed through five stages of the selectors for 32-bit shift. In order to improve the processing speed, such a circuit may be incorporated in place of the above that the process corresponding to those at two stages can be carried out at a time by employing the 4-input selector with a combined selecting function instead of the 2-input selector. For example, 1-bit shift and 2-bit shift are employed as inputs of the selector at one stage to enable selection of 3-bit leftward shift, 1-bit leftward shift, or no shift. However, if parallel shift function is added to such circuit, a circuit configuration of the shifter becomes complicated since the code extension selectors are increased three times every bit. In addition, in the barrel shifter which can effect both the leftward shift and the rightward shift, the code extension selectors are also increased two times and therefore a circuit configuration of the shifter becomes further difficult in respects of area and speed.

As described above, in the data split parallel shifter in the prior art in which split data are shifted in parallel respectively, if the code extension process is to be effected, such data split parallel shifter needs twice the selectors as many as the normal shifter without the code extension function, which yields increase in size and reduction in the processing speed. Further, since a time required for generating extension codes previously is added to the entire operating time of the shifter, the processing speed is lowered much more.

Next, the adder/subtractor in the prior art will be explained.

As the adder/subtractor in the prior art, there is a carry-select type adder/subtractor. The carry-select type is employed to accelerate the processing speed. More particularly, two adders each has respectively one of two way carries which are to be output from the lower bit adder as its constant respectively are prepared to obtain two way added results previously in upper bit calculation without waiting the carry from the lower bit adder, so that one of two way added results can be selected in the upper bit calculation based on the carry from the lower bit adder.

The carry-select type adder/subtractor in the prior art comprises a lower 16-bit adder, two adders for effecting upper 16-bit addition, and a carry/SUM selector for selecting one of added results from the two adders according to the carry supplied from the lower 16-bit adder to output it.

Besides, there is a technique to add a parallel processing function to such carry-select type adder/subtractor. FIG. 4 is a view showing the carry-select type adder/subtractor with the parallel processing function in the prior art. In the carry-select type adder/subtractor having the parallel processing function in the prior art shown in FIG. 4, a carry controller 117 is added to the carry-select type adder/subtractor in the prior art which comprises a lower 16-bit adder 111, two 16-bit adders 113, 115 for effecting the upper 16-bit addition, and a carry/SUM selector 119 as its constituent elements.

In the carry-select type adder/subtractor with the parallel processing function in the prior art, in case the 32-bit addition/subtraction is effected, the carry controller 117 sends the carry supplied from the lower 16-bit adder 111 to the carry/SUM selector 119 as it is. In case the 16-bit parallel addition/subtraction is effected, the carry controller 117 always sends the information indicating no carry (e.g., "0") to the carry/SUM selector 119 regardless of the carry supplied from the lower 16-bit adder 111. Therefore, the carry/SUM selector 119 can always select the output data from the upper 16-bit adder which outputs the added result for the case where no carry is supplied from the lower digits. As a result, the 16-bit parallel addition/subtraction can be accomplished.

However, in the case of the adder/subtractor in the prior art, since the controller is added to the upper bit adder and the lower bit adder, additional delay is caused in such added controller when the adder/subtractor is used as one adder circuit. This delay becomes remarkable as the split number is increased. Therefore, such delay becomes a serious issue in the event that a high speed processing is requested.

SUMMARY OF THE INVENTION

Therefore, the present invention has been made in light of the above problems and it is an object of the present invention to provide a data split parallel shifter which is able to shorten a processing time necessary for a data split parallel shifting process including code extension.

It is another object of the present invention to provide a high speed adder/subtractor.

It is still another object of the present invention to provide an efficient carry-select type adder/subtractor.

In order to achieve the above objects, there is provided a data split parallel shifter comprising: a shifter for receiving to-be-shifted data and an amount of shift, and then shifting the to-be-shifted data according to the amount of shift; a code extension data generator for receiving the to-be-shifted data, split mode information, and arithmetic/logical shift information, and then generating code extension data corresponding to respective fields of the to-be-shifted data which is split based on the split mode information; a mask signal generator for generating a mask signal, which is used to select data shifted by the shifter and the code extension data alternatively bit by bit, based on the amount of shift and the split mode information; and an output selector for receiving the data shifted by the shifter, the code extension data, and the mask signal, then selecting the data shifted by the shifter and the code extension data alternatively for respective bits of the data shifted by the shifter based on the mask signal, and then outputting data which are shifted and code-extended according to the split mode information and the arithmetic/logical shift information.

In the preferred embodiment of the present invention, the shifter receives further leftward/rightward shifting information and then shifts the to-be-shifted data leftward or rightward based on the leftward/rightward shifting information, and the mask signal generator receives further the leftward/rightward shifting information and then generates the mask signal further based on the leftward/rightward shifting information.

In the preferred embodiment of the present invention, the mask signal generator generates mask signals for minimum field which is decided based on all available split mode information, based on lower bit information in the amount of shift, the lower bit information having a number of digits by which a number of bits of the minimum field can be represented, and generates the mask signal by selecting overall masking of the minimum field, or masking of bits in the minimum field by the masking signal, or overall no-masking of the minimum field for each minimum field, based on upper bit information in the amount of shift, the upper bit information having a number of digits by which a number of the minimum field decided by a total number of bits of to-be-shifted data and a number of bits of the minimum field can be represented.

In order to achieve the above objects, there is provided a parallel adder comprising: a least significant unit adder for receiving a least significant portion of arithmetic data to execute an adding operation; at least a pair of unit adders, each unit adder of each pair of unit adders, receiving corresponding portion of the arithmetic data and split mode information to execute the adding operation; and at least one selector provided correspondingly to the at least a pair of unit adders, each of the at least one selector receiving results of respective adding operations from corresponding pair of unit adders and carry information supplied from lower digits, and then selecting one of the results of the respective adding operations according to the carry information to then output the selected one.

According to the present invention, if the split mode information indicates that the upper calculation is not independent from the lower calculation, a pair of unit adders output added results for the cases where the carry is supplied from lower digits and no carry is supplied from lower digits respectively. Therefore, at that time, the selector outputs alternatively one of the added results obtained when the carry is supplied from lower digits and no carry is supplied from lower digits, according to the carry supplied from lower digits. In contrast, if the split mode information indicates that the upper calculation is independent from the lower calculation, both a pair of unit adders output added results for the case where no carry is supplied from lower digits. Therefore, at that time, the selector outputs the added result obtained when no carry is supplied from lower digits, regardless of the carry supplied from lower digits. As a result, the adding process can be effected in parallel independently by the adders which are split into any number at any locations. According to such parallel adding processing device, since there is no necessity of adding an extra control circuit deciding whether or not the carry is passed over upper digits, the parallel adding process can be carried out at high speed.

In the preferred embodiment of the present invention, both unit adders of each pair of unit adders output a result of an adding operation for a case where no carry is supplied from lower digits when the split mode information indicates that the adding operation is independent of an adding operation in the least significant unit adder or a lower adjacent pair of unit adders.

In the preferred embodiment of the present invention, a number of the pair of unit adders is two or more.

In order to achieve the above objects, there is provided a parallel subtractor comprising: a least significant unit subtractor for receiving a least significant portion of arithmetic data to execute a subtracting operation; at least a pair of unit subtractors, each unit subtractor of each pair of unit subtractors, receiving corresponding portion of the arithmetic data and split mode information to execute the subtracting operation; and at least one selector provided correspondingly to the at least a pair of unit subtractors, each of the at least one selector receiving results of respective subtracting operations from corresponding pair of unit subtractors and carry information supplied from lower digits, and then selecting one of the results of the respective subtracting operations according to the carry information to then output the selected one.

According to the present invention, if the split mode information indicates that the upper calculation is not independent from the lower calculation, a pair of unit subtractors output subtracted results for the cases where the carry is supplied from lower digits and no carry is supplied from lower digits respectively. Therefore, at that time, the selector outputs alternatively one of the subtracted results obtained when the carry is supplied from lower digits and no carry is supplied from lower digits, according to the carry supplied from lower digits. In contrast, if the split mode information indicates that the upper calculation is independent from the lower calculation, both a pair of unit subtractors output subtracted results for the case where no carry is supplied from lower digits. Therefore, at that time, the selector outputs the subtracted result obtained when no carry is supplied from lower digits, regardless of the carry supplied from lower digits. As a result, the subtracting process can be effected in parallel independently by the subtractors which are split into any number at any locations. According to such parallel subtracting processing device, since there is no necessity of adding an extra control circuit deciding whether or not the carry is passed over upper digits, the parallel subtracting process can be carried out at high speed.

In the preferred embodiment of the present invention, both unit subtractors of each pair of unit subtractors output a result of a subtracting operation for a case where no carry is supplied from lower digits when the split mode information indicates that the subtracting operation is independent of a subtracting operation in the least significant unit subtractor or a lower adjacent pair of unit subtractors.

In the preferred embodiment of the present invention, a number of the pair of unit subtractors is two or more.

In order to achieve the above objects, there is provided a parallel adder/subtractor comprising: a least significant unit adder/subtractor for receiving a least significant portion of arithmetic data to execute an adding or subtracting operation; at least a pair of unit adders/subtractors, each unit adder/subtractor of each pair of unit adders/subtractors, receiving corresponding portion of the arithmetic data and split mode information to execute the adding or subtracting operation; and at least one selector provided correspondingly to the at least a pair of unit adders/subtractors, each of the at least one selector receiving results of respective adding or subtracting operations from corresponding pair of unit adders/subtractors and carry information supplied from lower digits, and then selecting one of the results of the respective adding or subtracting operations according to the carry information to then output the selected one.

According to the present invention, if the split mode information indicates that the upper calculation is not independent from the lower calculation, a pair of unit adders/subtractors output added or subtracted results for the cases where the carry is supplied from lower digits and no carry is supplied from lower digits respectively, according to addition/subtraction information. Therefore, at that time, the selector outputs alternatively one of the added or subtracted results obtained when where the carry is supplied from lower digits and no carry is supplied from lower digits, according to the carry supplied from lower digits. In contrast, if the split mode information indicates that the upper calculation is independent from the lower calculation, both a pair of unit adders/subtractors output added or subtracted results for the case where no carry is supplied from lower digits, according to addition/subtraction information. Therefore, at that time, the selector outputs the added or subtracted result obtained when no carry is supplied from lower digits, regardless of the carry supplied from lower digits. In addition, according to addition/subtraction information, the addition or the subtraction can be set arbitrarily onto respective portions split by the split mode information. As a result, the adding or subtracting process can be effected in parallel independently by the adders/subtractors which are split into any number at any locations. According to such parallel adding/subtracting processing device, since there is no necessity of adding an extra control circuit deciding whether or not the carry is passed over upper digits, the parallel adding/subtracting process can be carried out at high speed.

In the preferred embodiment of the present invention, both unit adders/subtractors of each pair of unit adders/subtractors output a result of an adding or subtracting operation for a case where no carry is supplied from lower digits when the split mode information indicates that the adding or subtracting operation is independent of an adding or subtracting operation in the least significant unit adder/subtractor or a lower adjacent pair of unit adders/subtractors.

In the preferred embodiment of the present invention, a number of the pair of unit adders/subtractors is two or more.

The nature, principle and utility of the invention will become more apparent from the following detailed description when read in conjunction with the accompanying drawings.

DESCRIPTION OF THE PREFERRED EMBODIMENTS

Embodiments of the present invention will be explained in detail with reference to the accompanying drawings hereinafter.

Figure 5:
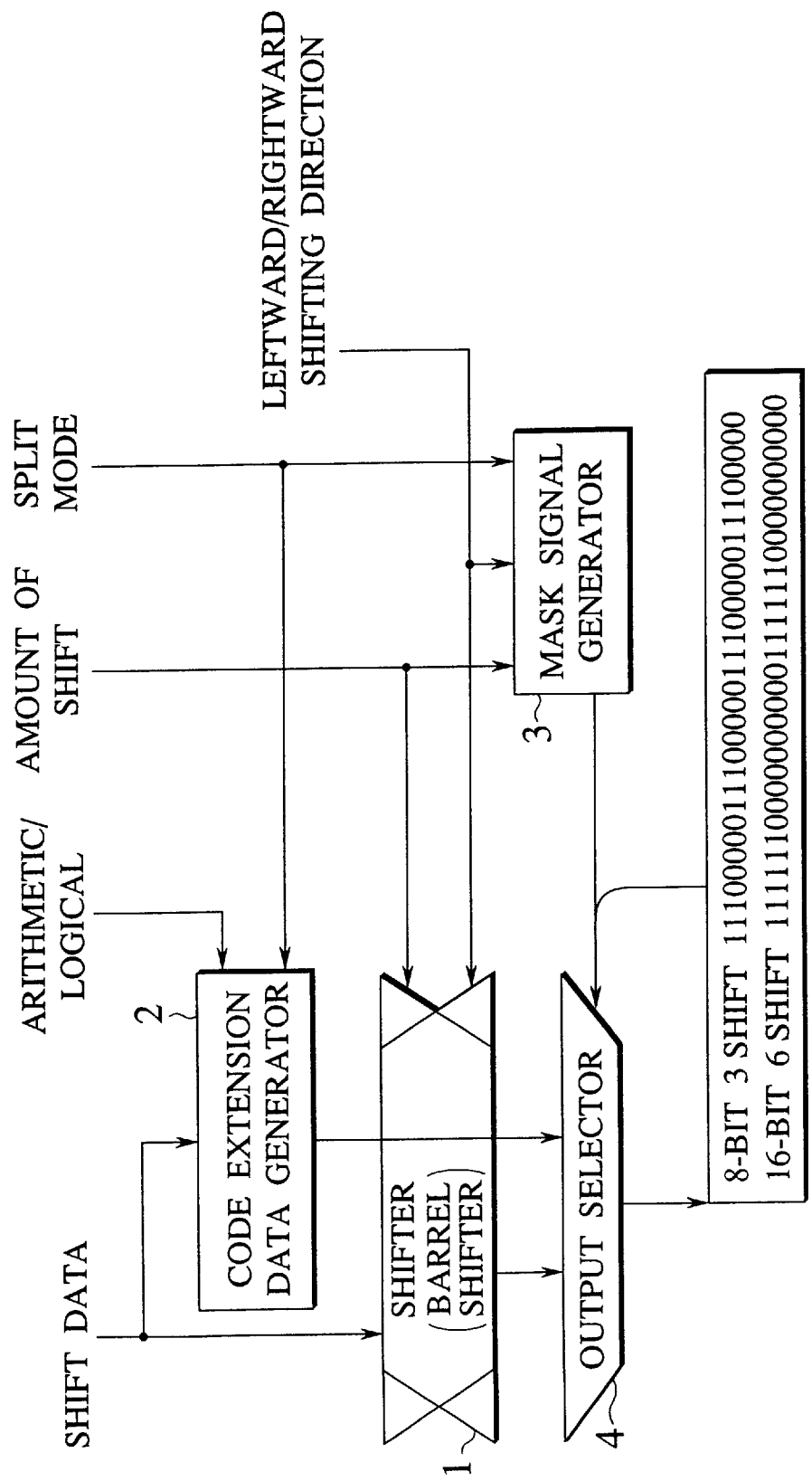
FIG. 5 is a view showing a configuration of a data split parallel shifter according to a first embodiment of the present invention.

FIG. 5 is a view showing a configuration of a data split parallel shifter according to a first embodiment of the present invention. In FIG. 5, the data split parallel shifter is constructed to comprise a normal shifter (barrel shifter) 1 without a split shifting function, a code extension data generator 2 for generating code extension data according to split modes, a mask signal generator 3 for generating a mask signal to decide to which bit the code extension is applied by decoding an amount of shift, and an output selector 4 for selecting the normally shifted data or the code extension data from the code extension data generator 2 according to the mask signal from the mask signal generator 3. A data split parallel shifting function with a delay time in the shifting process, in which a delay in a final stage is added to the delay in the normal shifting process, can be achieved by carrying out a shifting process of input data, generation of code extension data, and generation of a mask signal in parallel.

The data split parallel shifter according to the first embodiment is a 32-bit rightward shifter which has a 32 bit shift mode, a 16 bit×2 shift mode, and a 8 bit×4 shift mode, and executes an arithmetic rightward shift and a logical rightward shift. The shifter 1 is shown in FIG. 5 as a barrel shifter which can shift data in both the left direction and the right direction. In this case, since only the rightward shift is employed in the first embodiment, the barrel shifter shown in FIG. 5 is used as a rightward dedicated shifter 1 and thus a control signal indicating the leftward/rightward shifting direction will not be taken into account in the first embodiment.

Figure 1:
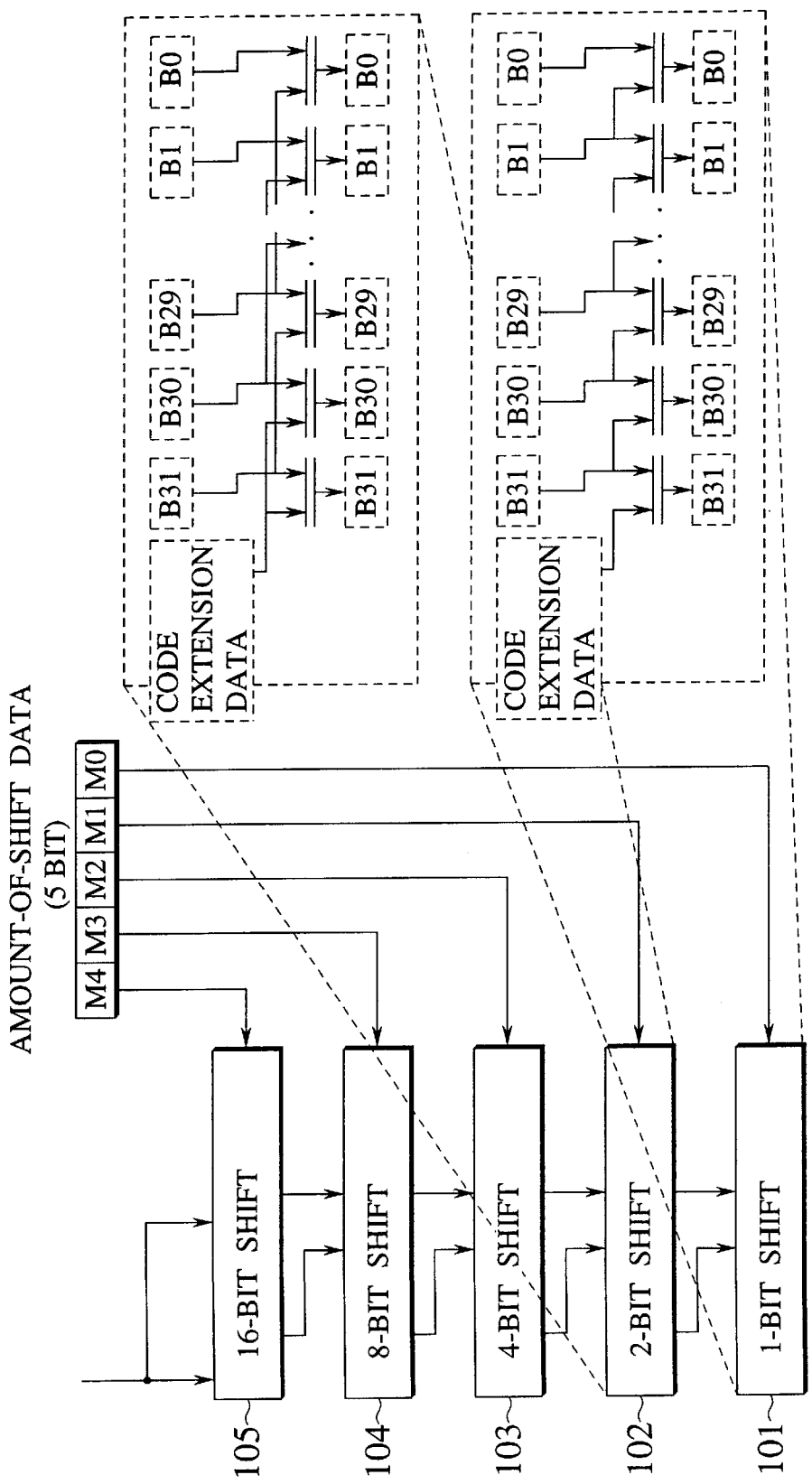
FIG. 1 is a view showing a configuration of a 32-bit rightward shifter without an input data splitting function.
Figure 2:
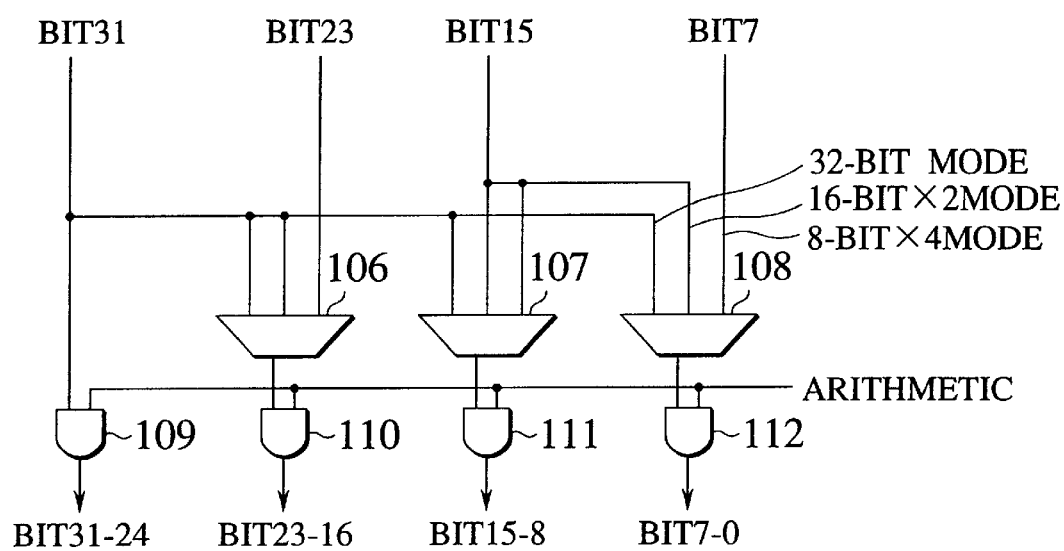
FIG. 2 is a view showing a configuration of a code extension data generator.
Figure 3:
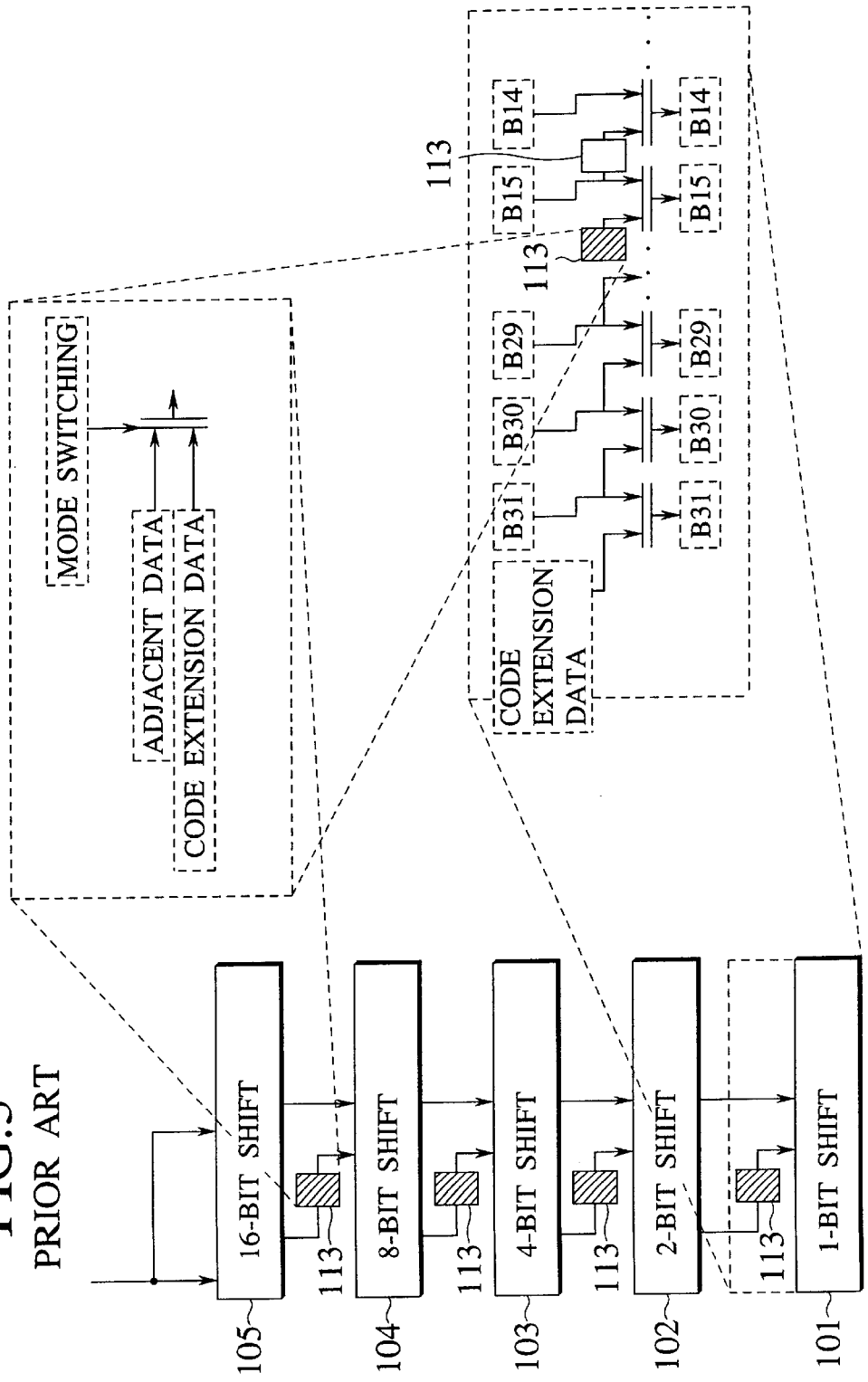
FIG. 3 is a view showing a configuration of a data split parallel shifter in the prior art.
Figure 4:
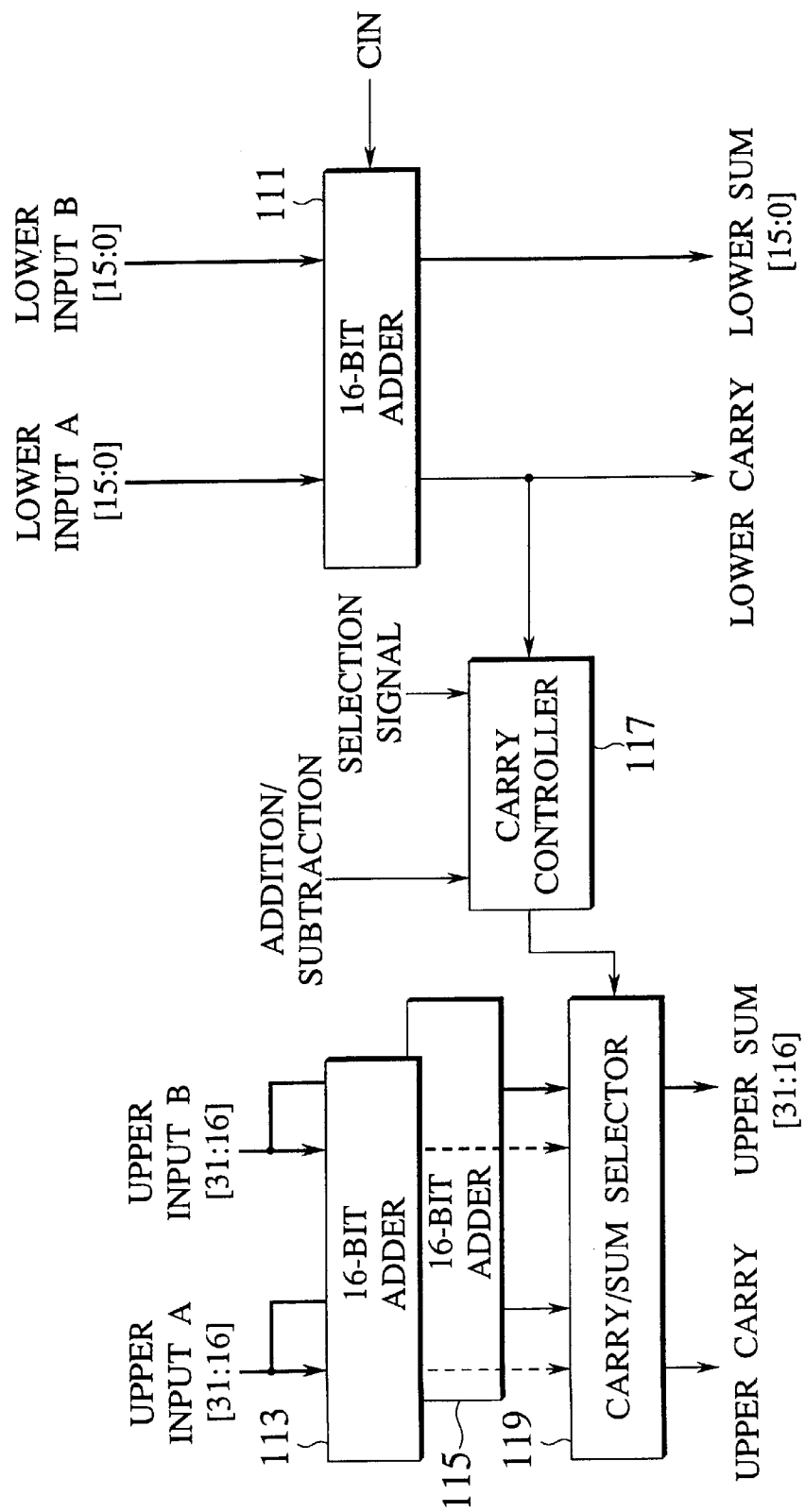
FIG. 4 is a view showing a carry-select type adder/subtractor with a parallel processing function in the prior art.

The shifter which has been explained in the prior art and shown in FIG. 1 is also employed as the shifter 1. Similarly, the code extension data generator which has been explained in the prior art and shown in FIG. 2 is also employed as the code extension data generator 2.

Next, the mask signal generator 3 as a feature of the present invention will be explained hereinbelow.

Split modes for the 32-bit input data, which are supposed in the first embodiment, are three modes, i.e., a 32 bit split mode, a 16 bit×2 split mode, and a 8 bit×4 split mode. Therefore, such a configuration is easily adopted as the circuit that at first 8-bit mask signal which is minimum split unit are generated from lower three bits in the signal indicating an amount of shift, then a 32-bit mask signal is generated by selecting one of the entire 8-bit masking, the masking by using the 8-bit mask signal, or no masking of all 8-bits with respect to each of four 8-bit fields based on upper two bits in the signal indicating the amount of shift and three mode signals.

Figure 6:
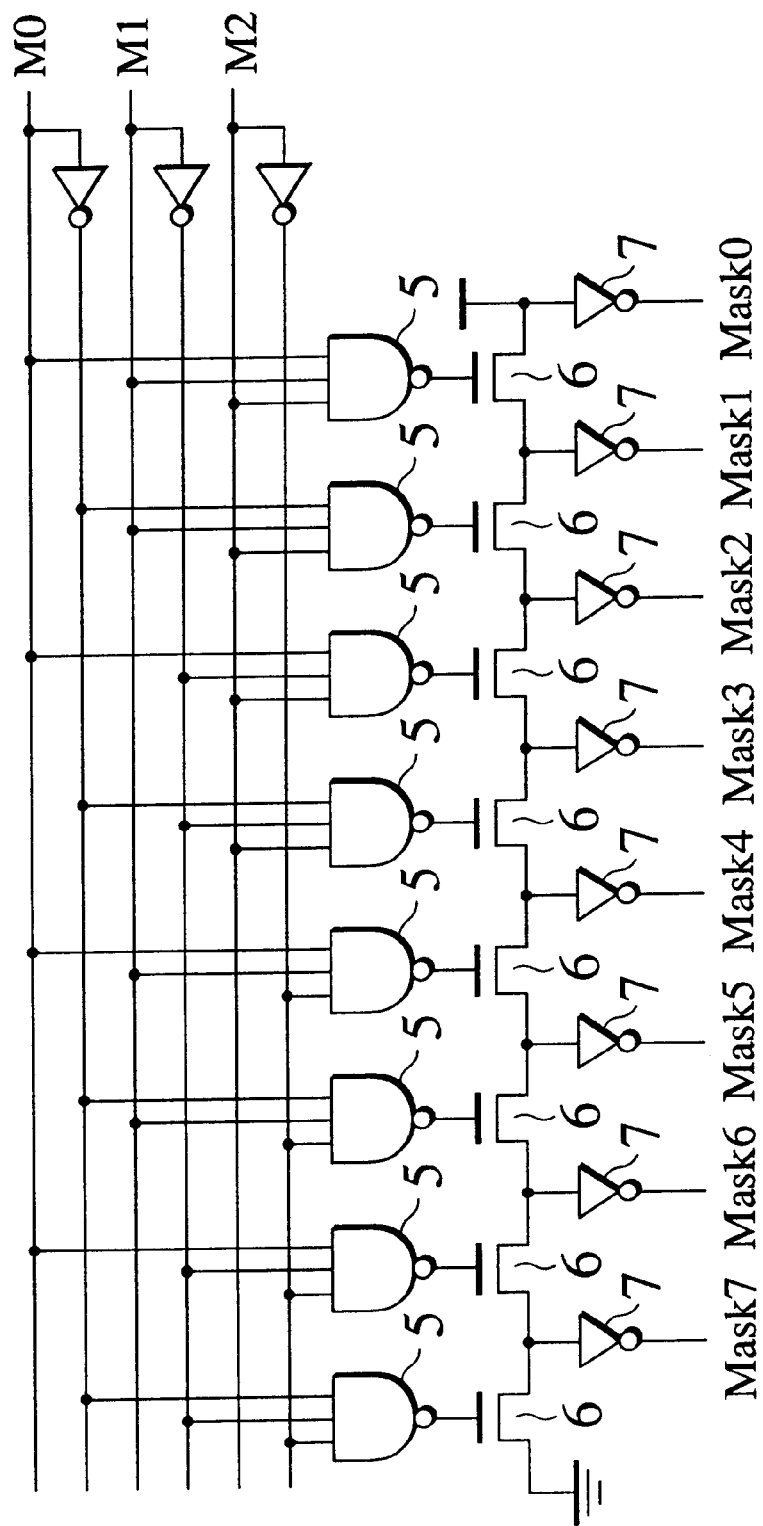
FIG. 6 is a view showing a configuration of an 8-bit mask signal generator.

An 8-bit mask signal generator 8 for generating 8-bit mask signal from lower three bits in the signal indicating the amount of shift is shown in FIG. 6. In FIG. 6, the mask signal generator 8 is one type of decoders and comprises a plurality of NANDs 5 which receive the amount of shift or the inverted amount of shift, a plurality of series-connected transistors 6 whose conduction is controlled according to outputs of the plurality of NANDs 5 respectively, and a plurality of inverters 7 for receiving signals from series-connecting points between the plurality of transistors 6 respectively and then outputting the 8-bit mask signal, i.e., Mask0 to Mask7.

In such configuration, when values M2, M1, M0 which are lower three bits in the signal indicating the amount of shift are fixed, only the output of the NAND 5 corresponding to the values becomes "0" and then a gate of the transistor 6 connected to this output of the NAND 5 is closed. Since the other NANDs 5 output "1", the transistors 6 connected to outputs of the other NANDs 5 are turned ON. Therefore, respective nodes of the transistors 6 which are positioned in the left side of the closed transistor 6 become all "0", whereas respective nodes of the transistors 6 which are positioned in the right side of the closed transistor 6 become all "1". Out of the inverters 7 which are connected to respective nodes, the inverters 7 which are positioned in the left side of the closed transistor 6 output "1", whereas the inverters 7 which are positioned in the right side of the closed transistor 6 output "0". For example, in case the values of M2, M1, M0 are "0", "1", "1", only the output of the fourth NAND 5 from the left becomes "0". Hence, input nodes of the inverters 7 from Mask7 to Mask5 become "0", whereas input nodes of the inverters 7 from Mask4 to Mask0 become "1". As a result, Mask7 to Mask0 become "1110000".

In turn, a logic for generating a higher order mask signal than the 8-bit unit will be explained. Each 8-bit unit in the mask signal can take three states, i.e., a state wherein all 8 bits are masked, a state wherein masked bits are decided according to the output of the 8-bit mask signal generator 8, a state wherein all 8 bits are not masked. For instance, in the 32 bit mode wherein a signal indicating an amount of shift is "01011", the mask signal is given as 11111111 11100000 00000000 00000000

That is, all the most significant 8-bits are brought into a masked state, the 8-bit mask signal of the 8-bit mask signal generator 8 are applied to the second most significant 8-bits, and the third most significant 8-bits and the least significant 8-bits are brought into an unmasked state. In the 16 bit×2 mode wherein a signal indicating an amount of shift is the same as above, the mask signal is given as 11111111 11100000 11111111 11100000

Figure 7:
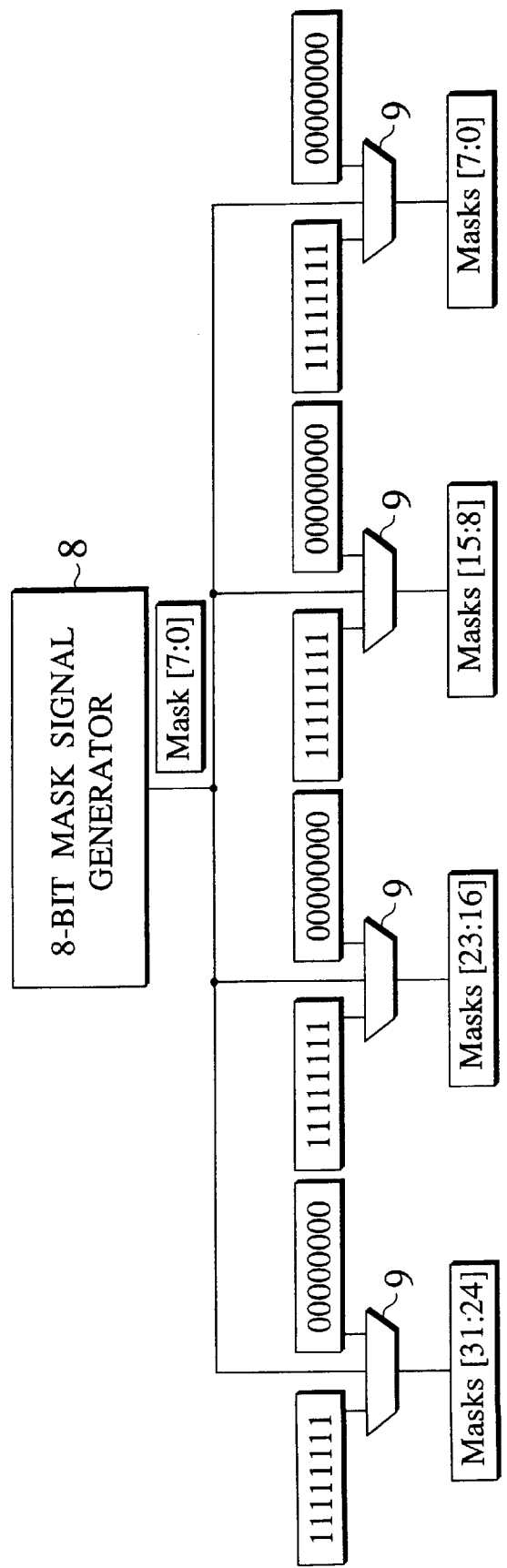
FIG. 7 is a view showing a configuration of a mask signal generator.

Based on M4, M3 which are upper two bits of the signal of the amount of shift, the shift mode signals mode32, mode16, mode8, the output Mask [7:0] of the 8-bit mask signal generator 8, an equation for generating the mask signal masks [31:0] will be given in the following. Where, in the following equation, | denotes a logical sum, & denotes a logical product, and b denotes inversion of the signal.

if(M4|M3)
    masks[31:24]=11111111;
elseif (M4b & M3b)
    masks[31:24]=Mask[7:0];
else
    masks[31:24]=00000000;
endif
if ((M4 & (mode32|mode16))|((M4|M3) & mode8))
    masks[23:16]=11111111;
elseif ((M4|M3) & mode32|M3 & mode16|M4b & M3b & mode8)
    masks[23:16]=Mask[7:0];
else
    masks[23:16]=00000000;
endif
if ((M3 & M4) & mode32|(M3|M2)&(mode16|mode8))
    masks[15:8]=11111111;
elseif ((M4 & mode32)|(M3b & M4b)&(mode16|mode8))
    masks[15:8]=Mask[7:0];
else
    masks[15:8]=00000000;
endif
if ((M4 & mode16|(M3|M4) & mode8)
    masks[7:0]=11111111;
elseif ((M3 & M4 & mode32)|(M3 & mode16)|(M4b & M3b & mode8))
    masks[7:0]=Mask[7:0];
else
    masks[7:0]=00000000;

If-statements in the above equation are selection signal logics. According to the selection signal, multiplexers 9 of the mask signal generator 3 shown in FIG. 7 can select all "1" in 8 bits, Mask[7:0], or all "0" in 8 bits and then the mask signal generator 3 outputs them as its outputs.

Shift data is output from the shifter 1 and also code extension data is output from the code extension data generator 2. Then, according to the mask signal generated by the mask signal generator 3, the final stage output selector 4 can obtain the final outputs by selecting in bit unit the code extension data if the mask signal is "1" and the shift data if the mask signal is "0".

The shifter 1, the code extension data generator 2, and the mask signal generator 3 can execute their processes completely independently respectively until the data come up to the final stage output selector 4. For this reason, a delay in the circuit is not given by accumulative addition of mutual delays as shown in the prior art, but the delay can be given as a sum of the maximum delay in the shifter 1, the code extension data generator 2, or the mask signal generator 3 and the delay in the final stage output selector 4. In the mask signal generator 3, the 8-bit mask signal generator 8 and logic circuits for generating upper select signals can execute their processes in parallel. Therefore, the shifter 1 according to the first embodiment can execute the shifting process with the delay time which can be roughly estimated by adding the delay in the final stage output selector 4 to the normal shifter, so that the processing time in the data split parallel shifting process can be reduced rather than the prior art.

Next, a data split parallel shifter according to a second embodiment of the present invention will be explained hereunder.

Except a configuration of a mask signal generator 3, the second embodiment is constructed substantially similarly to the above embodiment and the barrel shifter as shown in FIG. 5 may be employed as the shifter 1. In the shifter for executing only rightward shift shown in FIG. 5, the 2-input selector which can select either the shift data from the left direction or the simple passing of data is employed. In contrast, in the barrel shifter according to the second embodiment, a 3-input selector which can also select input shift data from the right direction is employed. That is, the 1-bit shifter can select one of data next on the right side by one bit, data next on the left side by one bit, and data without shift. A 7-input selector is employed in place of the 3-input selector in order to execute the process for two stages at a time in the barrel shift, same as the 4-input selector is employed in order to execute the process for two stages can be executed at a time in the rightward shifter.

In the code extension data generator, a sign bit of the data is generally MSB, which is the leftmost bit in the second embodiment. Hence, in the case of leftward shift, normally "0s" are filled into blank portions caused by the shift. As a result, the leftward shift can be done only by the logical shift, and the code extension data generator employed in the first embodiment can be employed as it is.

Figure 8:
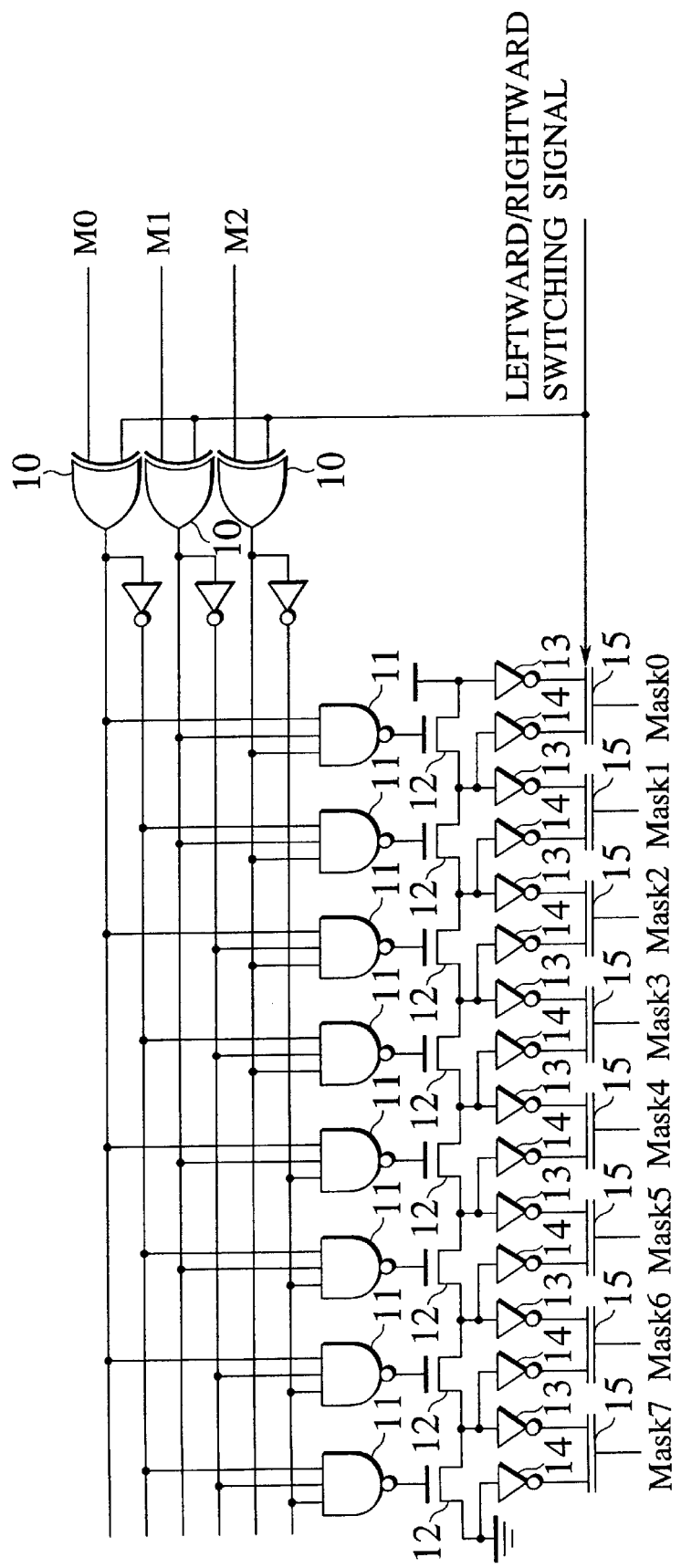
FIG. 8 is a view showing a configuration of an 8-bit mask signal generator for the data split parallel shifter according to a second embodiment of the present invention.

In order to respond to switching in the leftward/rightward shifting direction, additional circuits are needed in the mask signal generator. For example, as shown in FIG. 8, the 8-bit mask signal generator is constructed to comprise three EXORs 10 for receiving any one bit of lower three bits M0 to M2 in the signal indicating the amount of shift and a switching signal for switching the leftward/rightward shifting direction, a plurality of NANDs 11 for receiving outputs of the EXORs 10 or their inverted signals, a plurality of series-connected transistors 12 whose conduction is controlled by the outputs of the plurality of NANDs 11 respectively, a plurality of inverters 13 for inverting outputs of respective series-connecting points of the plurality of transistors 12, a plurality of buffers 14 for receiving outputs of series-connecting points of the transistors 12, and a plurality of selectors 15 for selecting the outputs of the inverters 13 or the outputs of the buffers 14 based on the switching signal of the leftward/rightward shifting direction to then output the mask signals Mask0 to Mask7. According to the switching signal of the leftward/rightward shifting direction, the amount of shift of data is inverted and then the output is also inverted and shifted by one bit. As a result, when the least significant three bits of the amount of shift are "011", in the rightward shift, Mask[7:0]=11100000 and, in the leftward shift,

Mask[7:0]=00000111

It is similar to the first embodiment that the mask signal generator having higher order than the 8-bit unit can select any of three outputs, i.e., all "1", all "0", and the output of the 8-bit mask signal generator. However, the logic of the select control signal must be changed in the same way as the 8-bit mask signal generator. Various embodiments may be thought of, but basically the upper portion and the lower portion may be formed to be an axial symmetry. That is, at the time of rightward shift, the select signal for generating the mask signal for bits [31:24] may be applied to bits [7:0] and the select signal for generating the mask signal for bits [23:16] may be applied to bits [15:8].

Selection of the shift data shifted by the barrel shifter 1 and the code extension data generated by the code extension data generator 2 can be similarly effected by the output selector 4 in the second embodiment.

In the second embodiment, the same effect as the above embodiment can be achieved with respect to any of leftward/rightward shift direction.

In the above first and second embodiments, the input data has been set to 32 bit data, and the split modes have been set to the 32 bit mode, the 16 bit×2 mode, and the 8 bit×4 mode. However, the present invention is not restricted by the bit number and the split mode of input data. For example, if the split modes for the 64-bit input data are set to a 64 bit mode, a 32 bit×2 mode, a 16 bit×4 mode, and a 8 bit×8 mode, the present invention can be similarly implemented by expanding the above embodiments.

As explained above, according to the data split parallel shifter of the present invention, since the shifting process of input data, generation of the code extension data, and generation of the mask signal which define to which bit the code extension should be applied can be carried out in parallel, a function for splitting the data into a plurality of fields and shifting the fields at the same time can be realized to increase the delay to such extent that the delay in one stage of the selector is added merely to the delay in the shifter in the prior art. As a result, the processing time for the data split parallel shifting process with the code extension can be shortened.

Subsequently, a parallel adder/subtractor according to a third embodiment of the present invention will be explained.

Figure 9:
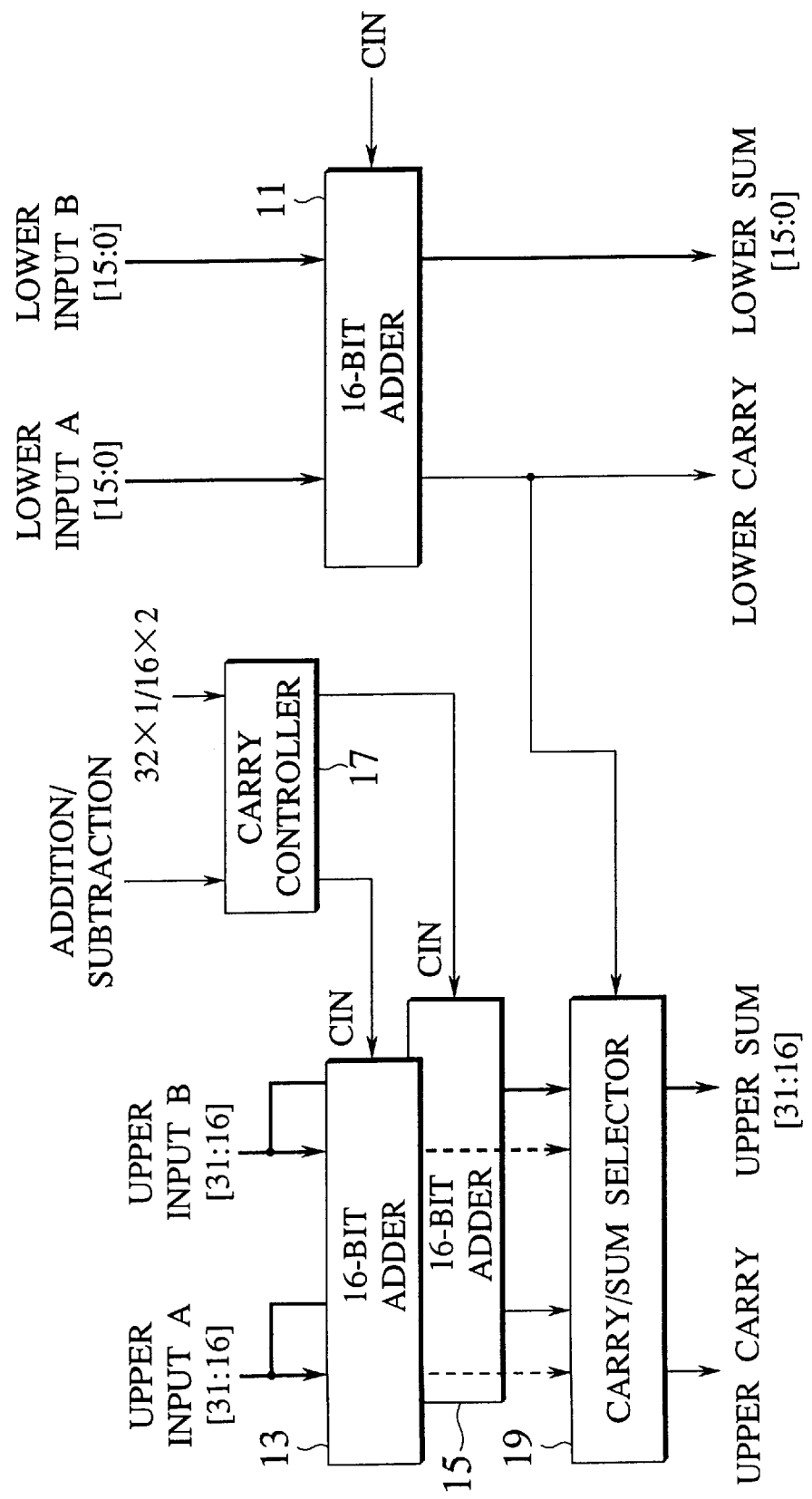
FIG. 9 is a view showing a configuration of a parallel adder/subtractor according to a third embodiment of the present invention.

A circuit diagram of the parallel adder/subtractor according to the third embodiment of the present invention is shown in FIG. 9. This parallel adder/subtractor has a configuration in which a 16-bit parallel adding function is added to the 32-bit adder in which the carry-select system is employed by the upper bit adder.

The carry-select type adder/subtractor according to the third embodiment comprises a lower 16-bit adder 11, and two upper 16-bit adders 13, 15, each can execute 16-bit addition independently. In addition, there is provided a carry/SUM selector 19 for receiving outputs of the upper 16-bit adders 13, 15 and then selecting any one of the outputs of two upper 16-bit adders 13, 15. There is also provided a carry controller 17 for inputting the carry into two upper 16-bit adders 13, 15.

Next, detailed operations of the carry-select type adder/subtractor will be explained hereunder. In the case of the 32-bit addition, an upper input data A and an upper input data B are input into both two upper 16-bit adders 13, 15. The carry controller 17 inputs, as the carry, "1" into one of two upper 16-bit adders 13, 15 and "0" into the other of two upper 16-bit adders 13, 15. Hence, added results obtained in respective cases where the carry from lower digits is "1" and "0" can be prepared. In contrast, a lower input data A and a lower input data B are input into the lower 16-bit adder 11. In the case of addition, "0" is input as the carry input at that time. The lower 16-bit adder 11 executes addition of the lower input data A and the lower input data B and then outputs the 16-bit added result and the carry. The carry/SUM selector 19 receives the carry from the lower 16-bit adder 11 and then outputs selectively the carry and the added result, which is supplied from the upper 16-bit adder inputting the same carry as the above carry, out of the added results being prepared by two upper 16-bit adders 13, 15 according to the value of carry.

In the case of parallel 16-bit addition, like the 32-bit addition, the upper input data A and the upper input data B are input into both two upper 16-bit adders 13, 15, while the lower input data A and the lower input data B are input into the lower 16-bit adder 11. The carry controller 17 inputs "0" into two upper 16-bit adders 13, 15 together as the carry. Therefore, both the upper 16-bit adders 13, 15 output the same added result. That is, even if either of the added results is selected by the carry/SUM selector 19, the added results and the carry can be derived relative to the upper 16 bits without being affected by the carry from the lower 16-bit adder 11. The lower 16-bit addition is effected in the same way as the 32-bit addition and then the lower 16-bit added result and the carry can be calculated.

In the case of subtraction, if two's complement representation of the subtrahend, i.e., the subtrahend which is derived by adding "1" to the least significant bit of the inverted subtrahend is employed, such subtraction can be carried out similarly. That is, in the case of 32-bit subtraction, if upper data of two's complement of the subtrahend and upper data of the minuend are input into two upper 16-bit adders 13, 15 and also, as the carry, "1" is input into one of two upper 16-bit adders 13, 15 and "0" is input into the other of two upper 16-bit adders 13, 15, such 32-bit subtraction can be effected in the similar way to the 32-bit addition. Also, in the case of 16-bit subtraction, if upper data of two's complement of the subtrahend and upper data of the minuend are input into two upper 16-bit adders 13, 15 and also "1" is input into both the upper 16-bit adders 13, 15 as the carry, such 16-bit subtraction can be effected in the similar way to the 16-bit addition.

Figure 10:
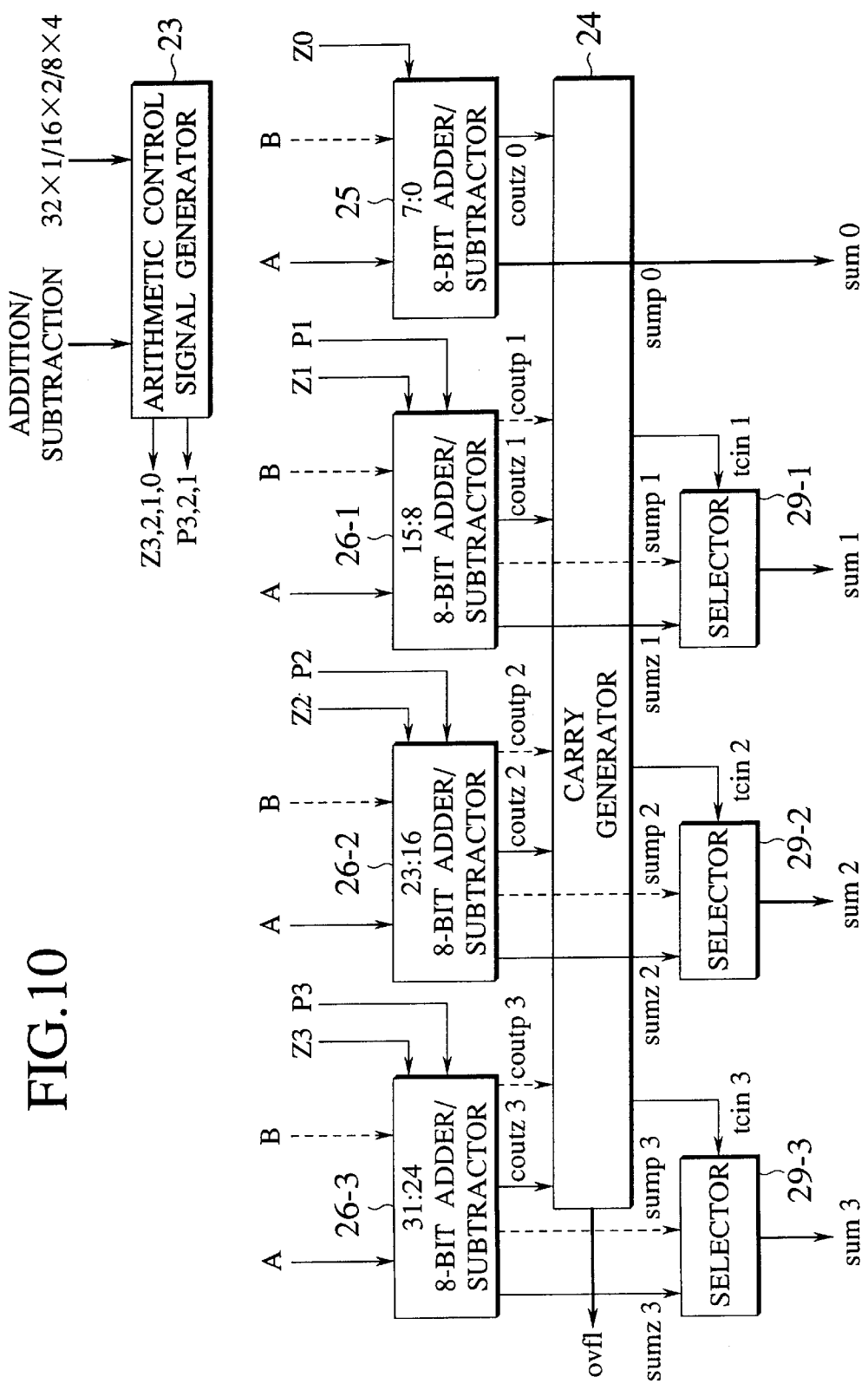
FIG. 10 is a view showing a configuration of a parallel adder/subtractor according to a fourth embodiment of the present invention.

A circuit diagram of a parallel adder/subtractor according to a fourth embodiment of the present invention is shown in FIG. 10. This fourth embodiment shows an example of the parallel adder/subtractor which can execute a 32-bit arithmetic process, a 16-bit arithmetic two parallel process, and an 8-bit arithmetic four parallel process. As constituent elements, the parallel adder/subtractor comprises 8-bit adders/subtractors 25, 26-1, 26-2, 26-3 for executing 8-bit addition/subtraction as the minimum unit of the parallel arithmetic process, an arithmetic control signal generator 23 for generating an arithmetic control signal supplied to the 8-bit adders/subtractors, a carry generator 24 for generating a carry when an arithmetic operation which is larger in size than 8 bit is effected, and selectors 29-1, 29-2, 29-3 for selecting calculated results generated by respective adders/subtractors based on the carry. The adder/subtractor according to the fourth embodiment executes in principal the calculation according to the carry select system. That is, if the parallel process is not executed, two way calculated results are generated for two cases where the carry is supplied from lower digits and where no carry is supplied from lower digits, and then the calculation is effected by selecting either of two type calculated results according to the actual carry from lower digits.

As described above, the fourth embodiment can execute the 32-bit arithmetic process, the 16-bit arithmetic two parallel process, and the 8-bit arithmetic four parallel process. Hence, the arithmetic control signal generator 23 generates two control signals for respective 8-bit adders/subtractors, which are minimum unit of calculation respectively, except the least significant 8-bit adder/subtractor, according to addition/subtraction and split mode. One control signal is input into the least significant 8-bit adder/subtractor.

The control signals output from the arithmetic control signal generator 23 are shown in the following.

| signal | z3 | p3 | z2 | p2 | z1 | p1 | z0 |
|---|---|---|---|---|---|---|---|
| 32 bit addition | 0 | 1 | 0 | 1 | 0 | 1 | 0 |
| 32 bit subtraction | 0 | 1 | 0 | 1 | 0 | 1 | 1 |
| 16 bit addition | 0 | 1 | 0 | 0 | 0 | 1 | 0 |
| 16 bit subtraction | 0 | 1 | 1 | 1 | 0 | 1 | 1 |
| 8 bit addition | 0 | 0 | 0 | 0 | 0 | 0 | 0 |
| 8 bit subtraction | 1 | 1 | 1 | 1 | 1 | 1 | 1 |

Where z3, p3 are control signals which are input into the most significant 8-bit adder/subtractor, z2, p2 are control signals which are input into the second most significant 8-bit adder/subtractor, z1, p1 are control signals which are input into the third most significant 8-bit adder/subtractor, and z0 is a control signal which is input into the least significant 8-bit adder/subtractor.

The subtraction process can be executed as $$A - B = A + \text{(two's complement representation of B)}$$
$$= A + \text{(bit inversion of B)} + 1$$

Therefore, in respective adders/subtractors, an inverter for inverting the input B in the case of subtraction, and a circuit for processing the control signal sent from the control signal generator 23 as "1" added to the end of the above equation are provided at preceding stages of the adder.

The 8-bit adder/subtractor can output the calculation result obtained when no carry is supplied from lower digits and the carry for the upper digits if the control signal is "0", and output the calculation result obtained when the carry is supplied from lower digits and the carry for the upper digits if the control signal is "1".

Except for the least significant 8-bit adder/subtractor, the upper 8-bit adders/subtractors can output two calculation results according to two control signals respectively. For example, the calculation results are given by the most significant 8-bit adder/subtractor as $$\text{sum}z3 = A[31:24] + (B[31:24]\hat{}\text{sub}) + z3$$

$$\text{sum}p3 = A[31:24] + (B[31:24]\hat{}\text{sub}) + p3$$

Where "coutz3" is a overflow carry signal in the calculation of above sumz0, and "coutp3" is a overflow carry signal in the calculation of above sump0.

In this case, "sumz3" is the calculated result corresponding to the control signal z3, and "sump3" is the calculated result corresponding to the control signal p3. "A[31:24]" indicates most significant 8 bits of 32 bit data to be calculated. "sub" indicates that such calculation is the subtraction. "^" indicates that the bit inversion of B[31:24] is effected by "sub".

Figure 11:
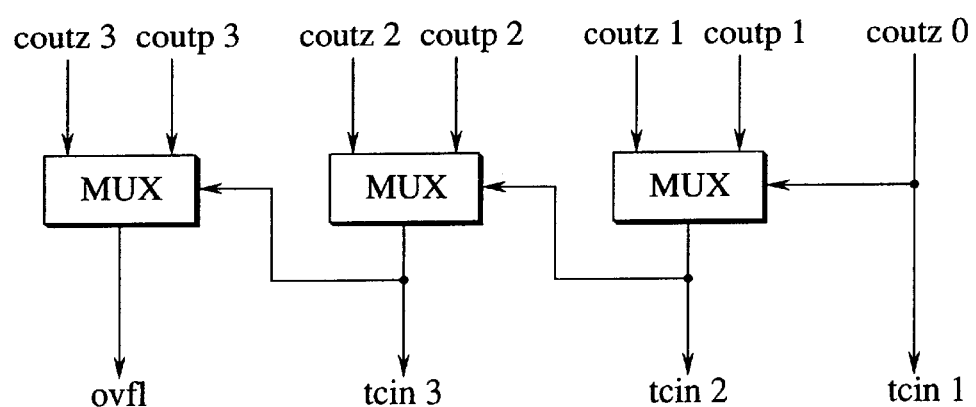
FIG. 11 is a view showing an example of a carry generator employed in the parallel adder/subtractor in the present invention.
Figure 12A:
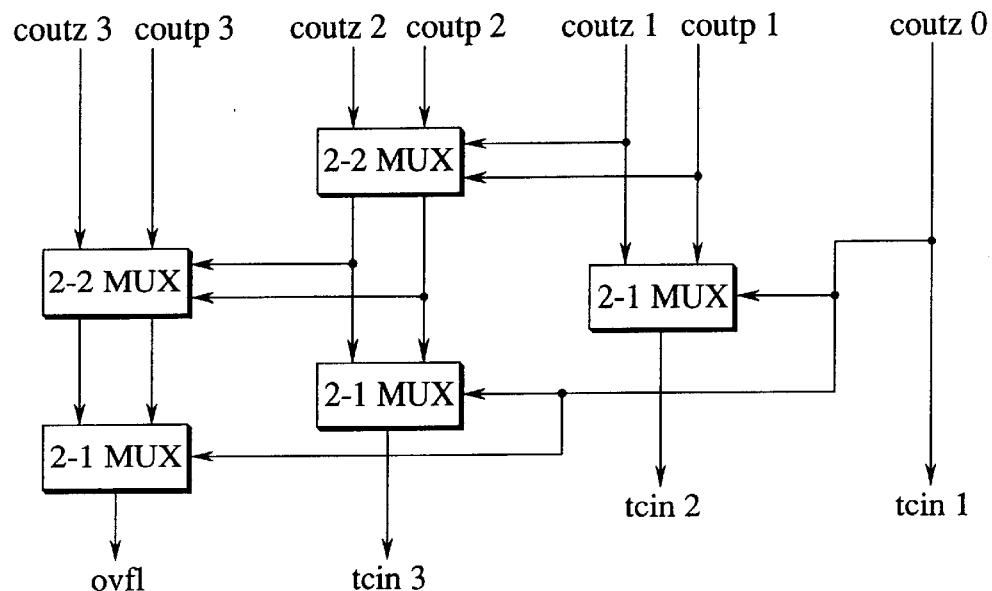
FIGS. 12A and 12B are views showing another example of the carry generator employed in the parallel adder/subtractor in the present invention.
Figure 12B:
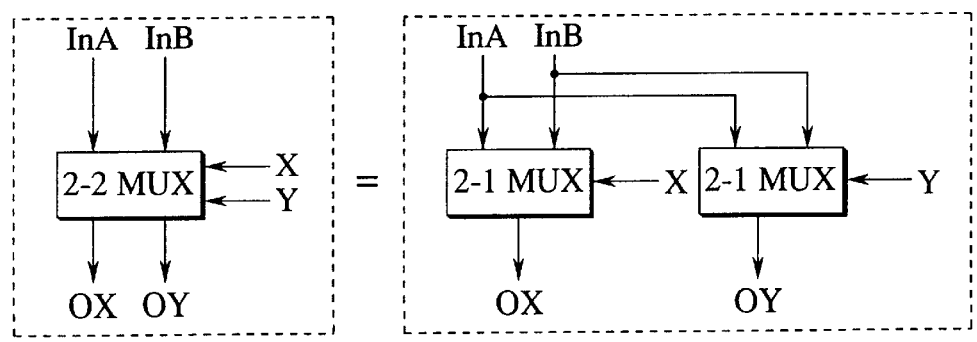

The carry generator 24 receives the carry signals coutz3, coutp3, coutz2, coutp2, coutz1, coutp1, coutz0 output from respective 8-bit adders/subtractors, and then generates the carry input signals which are to be actually input into respective 8-bit adders/subtractors, i.e., the carry input signals for the selectors 29-1, 29-2, 29-3, from the carry signals. An example of such carry generator 24 employed in the parallel adder/subtractor is shown in FIG. 11. In this example, three 2-input/1-output multiplexers are employed. If another example of the carry generator 24 employed in the parallel adder/subtractor shown in FIG. 12A is employed, the higher speed calculation can be achieved. In this case, as shown in FIG. 12B, since a 2-input/2-output multiplexer is equivalent to two 2-input/1-output multiplexers, the carry generator 24 can be composed of seven 2-input/1-output multiplexers.

Then, examples of concrete calculation will be shown hereunder. For example, the case where addition of the 32-bit data A=0xFFFFFFFF, B=0x00000001 (hexadecimal notation) is carried out is considered.

In the 32-bit addition mode, the control signals from the control signal generator 23 are given as

| signal | z3 | p3 | z2 | p2 | z1 | p1 | z0 |
|---|---|---|---|---|---|---|---|
| 32 bit addition | 0 | 1 | 0 | 1 | 0 | 1 | 0 | respectively. Data input into respective 8-bit adder/subtractors are

| | |
|---|---|
| A3 = 0xFF | B3 = 0x00 |
| A2 = 0xFF | B2 = 0x00 |
| A1 = 0xFF | B1 = 0x00 |
| A0 = 0xFF | B0 = 0x01 | and outputs from respective 8-bit adder/subtractors are

| | | | |
|---|---|---|---|
| sumz3 = 0xFF | coutz3 = 0 | sump3 = 0x00 | coutp3 = 1 |
| sumz2 = 0xFF | coutz2 = 0 | sump2 = 0x00 | coutp2 = 1 |
| sumz1 = 0xFF | coutz1 = 0 | sump1 = 0x00 | coutp1 = 1 |
| sumz0 = 0x00 | coutz0 = 1 | | |

Therefore, the carry input signals which are to be actually input into respective 8-bit adders/subtractors, i.e., the carry input signals for the selectors 29-1, 29-2, 29-3 are given as $tcin1 = coutz0 = 1$ $tcin2 = coutz1$ or ($coutp1$ and $coutz0$) = 0 or (1 and 1) = 1

$tcin3 = coutz2$ or ($coutp2$ and $coutz1$) or ($coutp2$ and $coutp1$ and $coutz0$) = 0 or (1 and 0) or (1 and 1 and 1) = 1

$ovf1 = coutz3$ or ($coutp3$ and $coutz2$) or ($coutp3$ and $coutp2$ and $coutz1$) or ($coutp3$ and $coutp2$ and $coutp1$ and $coutz0$) = 0 or (1 and 0) or (0 and 1 and 0) or (1 and 1 and 1 and 1) = 1

Since tcin1=1, the selector 29-1 selects sump1 of the outputs sumz1 and sump1 from the 8-bit adder/subtractor 26-1 as the final output. Similarly, in this example, sump 2 and sump 3 are selected by the selectors 29-2, 29-3 respectively. As a result, the 32-bit output is "0x00000000".

Then, the case where the 16-bit two parallel calculation is executed when the same input data is supplied will be discussed. Similarly, the control signals from the control signal generator 23 are given as

| signal | z3 | p3 | z2 | p2 | z1 | p1 | z0 |
|---|---|---|---|---|---|---|---|
| 16 bit addition | 0 | 1 | 0 | 0 | 0 | 1 | 0 | respectively. Outputs from respective 8-bit adder/subtractors are

| | | | |
|---|---|---|---|
| sumz3 = 0xFF | coutz3 = 0 | sump3 = 0x00 | coutp3 = 1 |
| sumz2 = 0xFF | coutz2 = 0 | sump2 = 0xFF | coutp2 = 0 |
| sumz1 = 0xFF | coutz1 = 0 | sump1 = 0x00 | coutp1 = 1 |
| sumz0 = 0x00 | coutz0 = 1 | | |

Therefore, the carry input signals which are to be actually input into respective 8-bit adders/subtractors, i.e., the carry input signals for the selectors 29-1, 29-2, 29-3 are given as $tcin1 = coutz0 = 1$ $tcin2 = coutz1$ or ($coutp1$ and $coutz0$) = 0 or (1 and 1) = 1

$tcin3 = coutz2$ or ($coutp2$ and $coutz1$) or ($coutp2$ and $coutp1$ and $coutz0$) = 0 or (1 and 0) or (0 and 1 and 1) = 0

$ovf1 = coutz3$ or ($coutp3$ and $coutz2$) or ($coutp3$ and $coutp2$ and $coutz1$) or ($coutp3$ and $coutp2$ and $coutp1$ and $coutz0$) = 0 or (1 and 0) or (0 and 1 and 0) or (1 and 0 and 1 and 1) = 0

Since tcin1=1 same as in the 32-bit calculation, the selector 29-1 selects sump1 of the outputs sumz1 and sump1 from the 8-bit adder/subtractor 26-1 as the final output. Similarly, the sump2 is selected by the selector 29-1 since tcin2=1. Since both sumz2 and sump2 output the calculated result obtained when no carry is supplied from lower digits according to the control signal, the data obtained in case no carry is supplied from lower digits can be output even when the sump2 is selected. In the 8-bit adder/subtractor 26-3, since the coutp2 indicating whether or not the carry supplied from lower 16 bits should be carry-propagated by the calculation in the 8-bit adder/subtractor 26-2 is "0", the carry is not propagated to the most significant digit, and the sumz3 is selected since tcin3=0. As a result, the 32-bit output is "0xFFFF0000".

In the case of the 8-bit four parallel calculation, the control signals are given as

| signal | z3 | p3 | z2 | p2 | z1 | p1 | z0 |
|---|---|---|---|---|---|---|---|
| 8 bit addition | 0 | 0 | 0 | 0 | 0 | 0 | 0 | respectively. Outputs from respective 8-bit adder/subtractors are

| | | | |
|---|---|---|---|
| sumz3 = 0xFF | coutz3 = 0 | sump3 = 0xFF | coutp3 = 0 |
| sumz2 = 0xFF | coutz2 = 0 | sump2 = 0xFF | coutp2 = 0 |
| sumz1 = 0xFF | coutz1 = 0 | sump1 = 0xFF | coutp1 = 0 |
| sumz0 = 0x00 | coutz0 = 1 | | |

Therefore, the carry input signals which are to be actually input into respective 8-bit adders/subtractors, i.e., the carry input signals for the selectors 29-1, 29-2, 29-3 are given as $t$cin1=1

$t$cin2=0

$t$cin3=0

Then, sumz3, sumz2, and sump1 are selected and the output result becomes "0xFFFFFF00".

Next, an example of the subtraction is shown. In the case of 32 bit subtraction, if the input data A=0x22222222, B=0xcccccccc are input, the control signals are given as

| signal | z3 | p3 | z2 | p2 | z1 | p1 | z0 |
|---|---|---|---|---|---|---|---|
| 32 bit subtraction | 0 | 1 | 0 | 1 | 0 | 1 | 1 | respectively. Outputs from respective 8-bit adder/subtractors are

| | | | |
|---|---|---|---|
| sumz3 = 0x55 | coutz3 = 0 | sump3 = 0x56 | coutp3 = 0 |
| sumz2 = 0x55 | coutz2 = 0 | sump2 = 0x56 | coutp2 = 0 |
| sumz1 = 0x55 | coutz1 = 0 | sump1 = 0x56 | coutp1 = 0 |
| sumz0 = 0x56 | coutz0 = 0 | | |

Therefore, the carry input signals which are to be actually input into respective 8-bit adders/subtractors, i.e., the carry input signals for the selectors 29-1, 29-2, 29-3 are given as $t$cin1=0

$t$cin2=0

$t$cin3=0

Thus, sumz3, sumz2, and sumz1 are selected and the output result becomes "0x55555556".

Next, in the case of 16-bit two parallel subtraction, the control signals are given as

| signal | z3 | p3 | z2 | p2 | z1 | p1 | z0 |
|---|---|---|---|---|---|---|---|
| 16 bit subtraction | 0 | 1 | 1 | 1 | 0 | 1 | 1 | respectively. Outputs from respective 8-bit adder/subtractors are

| | | | |
|---|---|---|---|
| sumz3 = 0x55 | coutz3 = 0 | sump3 = 0x56 | coutp3 = 0 |
| sumz2 = 0x56 | coutz2 = 0 | sump2 = 0x56 | coutp2 = 0 |
| sumz1 = 0x55 | coutz1 = 0 | sump1 = 0x56 | coutp1 = 0 |
| sumz0 = 0x56 | coutz0 = 0 | | |

Therefore, the carry input signals which are to be actually input into respective 8-bit adders/subtractors, i.e., the carry input signals for the selectors 29-1, 29-2, 29-3 are given as $t$cin1=0

$t$cin2=0

$t$cin3=0

Thus, sumz3, sumz2, and sumz1 are selected, but sumz2 outputs the same value as sump2 according to the control signal. As a result, the output result becomes "0x55565556".

In turn, in the case of 8-bit four parallel subtraction, the control signals are given as

| signal | z3 | p3 | z2 | p2 | z1 | p1 | z0 |
|---|---|---|---|---|---|---|---|
| 8 bit subtraction | 1 | 1 | 1 | 1 | 1 | 1 | 1 | respectively. Outputs from respective 8-bit adder/subtractors are

| | | | |
|---|---|---|---|
| sumz3 = 0x56 | coutz3 = 0 | sump3 = 0x56 | coutp3 = 0 |
| sumz2 = 0x56 | coutz2 = 0 | sump2 = 0x56 | coutp2 = 0 |
| sumz1 = 0x56 | coutz1 = 0 | sump1 = 0x56 | coutp1 = 0 |
| sumz0 = 0x56 | coutz0 = 0 | | |

Therefore, the carry input signals which are to be actually input into respective 8-bit adders/subtractors, i.e., the carry input signals for the selectors 29-1, 29-2, 29-3 are given as $t$cin1=0

$t$cin2=0

$t$cin3=0

Thus, sumz3, sumz2, and sumz1 are selected, and the output result becomes "0x56565656".

In the above adders/subtractors, both the addition and the subtraction can be also executed in parallel if the control signal generators are implemented such that the bit inversion can be controlled every 8-bit adder/subtractor. For example, in the 16-bit two parallel addition/subtraction, in case subtraction and addition are to be executed in upper 16 bits and lower 16 bits respectively, the addition/subtraction control signals sub are given by sub3=1 sub2=1 sub1=0 sub0=0 where the addition/subtraction control signals sub are set as sub3, sub2, sub1, sub0 in higher order. Respective control signals may set as

| signal | z3 | p3 | z2 | p2 | z1 | p1 | z0 |
|---|---|---|---|---|---|---|---|
| 16 bit addition/subtraction | 0 | 1 | 1 | 1 | 0 | 1 | 0 |

In addition to the above examples, if the control signal generators are expanded to further applications, uneven split locations can be implemented. For example, in order to achieve the upper 8-bit addition and the lower 24-bit addition, the control signals can be output as follows.

That is, respective control signals may set as

| signal | z3 | p3 | z2 | p2 | z1 | p1 | z0 |
|---|---|---|---|---|---|---|---|
| | 0 | 0 | 0 | 1 | 0 | 1 | 1 |

Furthermore, as still another example, if the addition is executed in the upper 24 bits and the subtraction is executed in the lower 8 bits, the control signals can be output as follows.

That is, respective control signals may set as

| signal | z3 | p3 | z2 | p2 | z1 | p1 | z0 |
|---|---|---|---|---|---|---|---|
| | 0 | 1 | 0 | 1 | 0 | 0 | 1 |
| | sub3 | | sub2 | | sub1 | | sub0 |
| | 0 | | 0 | | 0 | | 1 |

Moreover, in the arithmetic circuit with the carry generator of the type in which carry paths to be split can be seen clearly, as explained in the third embodiment, the split control can be accomplished if the control circuits are embedded in the carry paths, like the conventional examples. For instance, it is very difficult to insert the split control circuit into the arithmetic circuit having the carry generator like the carry array which is employed in the adder in ALPHA chip by DEC Corporation, i.e., the arithmetic circuit having the carry generator formed of CLA. In such arithmetic circuit, if the split control is tried by the method employed in the examples in the prior art, especially increase in circuit scale and reduction in speed appear remarkably.

On the contrary, according to a circuit configuration according to the present invention, even in the arithmetic circuit which has a carry generator formed of CLA, the split parallel calculation can be implemented without fail if the carry generators which correspond to the adders/subtractors other than the least significant adder/subtractor are similar to those employed in the prior art adder, including the above carry array system.

According to the present invention, the arithmetic control signal is input into the calculator as the minimum arithmetic unit. The design of the calculator can be facilitated if the arithmetic control signal is fixed at the same time or before to-be-calculated data is input into the calculator if possible, though depending upon design of the calculator. Fortunately, in the existing processor, a time is consumed until actual to-be-calculated data comes up to the calculator after the command has been fixed. For example, in the RISC processor, data in the register file is read out based on the command read from the command memory, and then data is transferred to the calculator as the to-be-calculated data. Hence, since a time is needed until data reaches the calculator after the command has been read out, a sufficient time for generating the control signal is given to the arithmetic control signal generator of the present invention, so that such time required for the control signal generation does never become substantially a critical path in the whole circuit. For this reason, in most cases of the embodiments, it may be supposed that the arithmetic control signal can be fixed before the to-be-calculated data comes up to the calculator.

In this case, the delay in the circuit due to inputting of the arithmetic control signal into respective calculators as minimum arithmetic unit can be concealed.

In the normal adder/subtractor, as described above, the bit inverting circuit is provided to execute the subtraction. More particularly, normally there is provided one stage of EXOR gate which receives the subtraction signal indicating the subtraction command and the subtrahend and then outputs bit inversion of the subtrahend according to EXOR in the case of subtraction. The added/subtracted result and the carry are generated from the augend/minuend and the addend/subtrahend after it has passed through EXOR. Therefore, the augend/minuend has a margin in time while the addend/subtrahend passes through the EXOR.

In contrast, the arithmetic control signal described in the present invention is equivalent to the carry which is input into the least significant bit. The calculated result which is derived from the augend/minuend, the addend/subtrahend, and the input carry is given by Augend/minuend $xor$ Addend/subtrahend after bit inversion $xor$ Input carry =Augend/minuend $xor$ (Addend/subtrahend $xor$ Subtraction signal) $xor$ Input carry =Augend/minuend $xor$ Input carry $xor$ (Addend/subtrahend $xor$ Subtraction signal)

=(Augend/minuend $xor$ Input carry) $xor$ (Addend/subtrahend $xor$ Subtraction signal)

Hence, this means that the EXOR of the augend/minuend and the input carry, i.e., arithmetic control signal can be calculated in parallel to the calculation of EXOR of the addend/subtrahend and the subtraction signal.

As a result, the delay due to addition of the arithmetic control signal can be completely concealed, and thus the parallel adder/subtractor which has the substantially equal speed and has various split arithmetic functions can be implemented.

Figure 13:
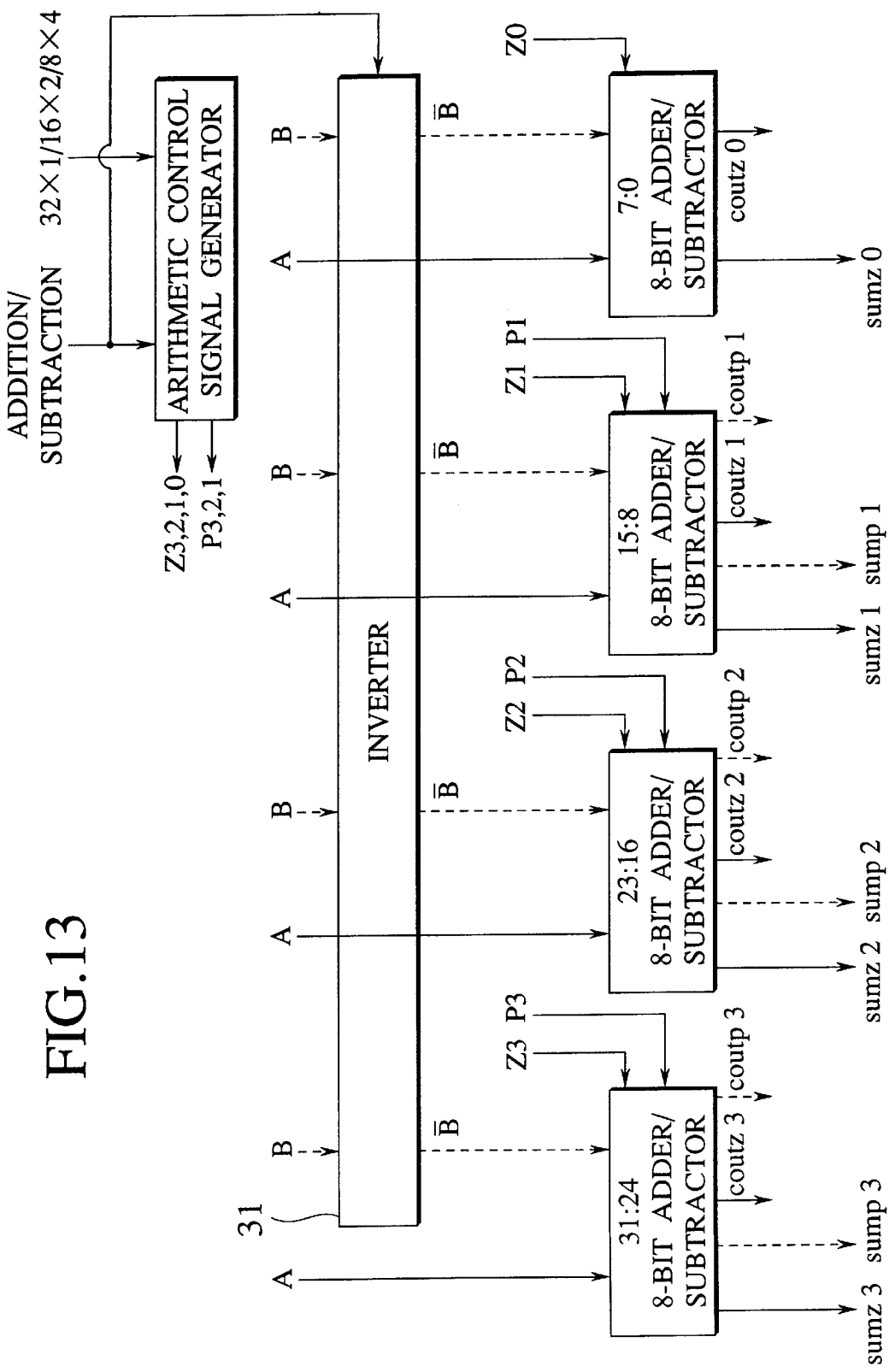
FIG. 13 is a view showing a configuration of a parallel adder/subtractor according to a fifth embodiment of the present invention.

Moreover, since the EXOR of the augend/minuend and the input carry, i.e., arithmetic control signal can be calculated in parallel to the calculation of EXOR of the addend/subtrahend and the subtraction signal, the inverters in respective 8-bit adders/subtractors can be provided independently. Such embodiment of the parallel adder/subtractor is shown in FIG. 13 as a fifth embodiment of the present invention.

As described above, according to the parallel adder/subtractor of the present invention, upon splitting the adder/subtractor to execute addition/subtraction in parallel, parallel processing information is directly input into respective adders/subtractors and then respective adders/subtractors output added/subtracted results in answer to the parallel processing information, instead of controlling the carry for the upper digits according to the parallel processing information. As a result, high speed parallel adders/subtractors can be realized without addition of extra controller.

It should be understood that many modifications and adaptations of the invention will become apparent to those skilled in the art and it is intended to encompass such obvious modifications and changes in the scope of the claims appended hereto.

What is claimed is:

1. A parallel adder comprising:

a least significant unit adder for receiving a least significant portion of arithmetic data to execute an adding operation;

at least a pair of unit adders, each unit adder of each pair of unit adders, receiving corresponding portion of the arithmetic data and split mode information to execute the adding operation; and at least one selector provided correspondingly to the at least a pair of unit adders, each of the at least one selector receiving results of respective adding operations from corresponding pair of unit adders and carry information supplied from lower digits, and then selecting one of the results of the respective adding operations according to the carry information to then output the selected one.

2. A parallel adder according to claim 1, wherein both unit adders of each pair of unit adders output a result of an adding operation for a case where no carry is supplied from lower digits when the split mode information indicates that the adding operation is independent of an adding operation in the least significant unit adder or a lower adjacent pair of unit adders.

3. A parallel adder according to claim 1, wherein a number of the pair of unit adders is two or more.

4. A parallel subtractor comprising:

a least significant unit subtractor for receiving a least significant portion of arithmetic data to execute a subtracting operation;

at least a pair of unit subtractors, each unit subtractor of each pair of unit subtractors, receiving corresponding portion of the arithmetic data and split mode information to execute the subtracting operation; and at least one selector provided correspondingly to the at least a pair of unit subtractors, each of the at least one selector receiving results of respective subtracting operations from corresponding pair of unit subtractors and carry information supplied from lower digits, and then selecting one of the results of the respective subtracting operations according to the carry information to then output the selected one.

5. A parallel subtractor according to claim 4, wherein both unit subtractors of each pair of unit subtractors output a result of a subtracting operation for a case where no carry is supplied from lower digits when the split mode information indicates that the subtracting operation is independent of a subtracting operation in the least significant unit subtractor or a lower adjacent pair of unit subtractors.

6. A parallel subtractor according to claim 4, wherein a number of the pair of unit subtractors is two or more.

7. A parallel adder/subtractor comprising:

a least significant unit adder/subtractor for receiving a least significant portion of arithmetic data to execute an adding or subtracting operation;

at least a pair of unit adders/subtractors, each unit adder/subtractor of each pair of unit adders/subtractors, receiving corresponding portion of the arithmetic data and split mode information to execute the adding or subtracting operation; and at least one selector provided correspondingly to the at least a pair of unit adders/subtractors, each of the at least one selector receiving results of respective adding or subtracting operations from corresponding pair of unit adders/subtractors and carry information supplied from lower digits, and then selecting one of the results of the respective adding or subtracting operations according to the carry information to then output the selected one.

8. A parallel adder/subtractor according to claim 7, wherein both unit adders/subtractors of each pair of unit adders/subtractors output a result of an adding or subtracting operation for a case where no carry is supplied from lower digits when the split mode information indicates that the adding or subtracting operation is independent of an adding or subtracting operation in the least significant unit adder/subtractor or a lower adjacent pair of unit adders/subtractors.

9. A parallel adder/subtractor according to claim 7, wherein a number of the pair of unit adders/subtractors is two or more.

* * * * *